March 23, 1937.    J. W. LOGAN, JR    2,074,750
TRAIN BRAKE APPARATUS
Filed June 5, 1935    3 Sheets-Sheet 1
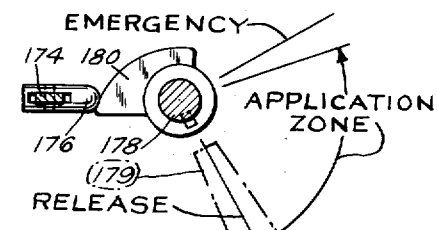
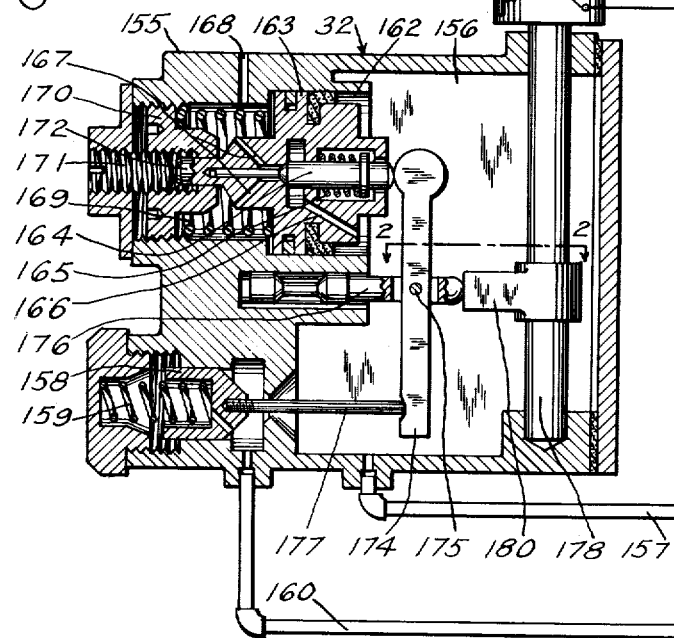
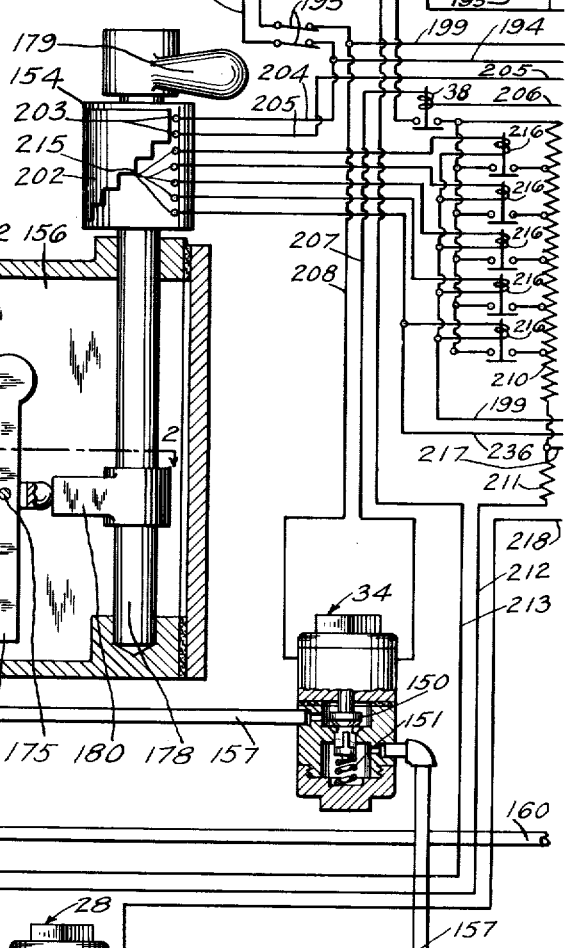
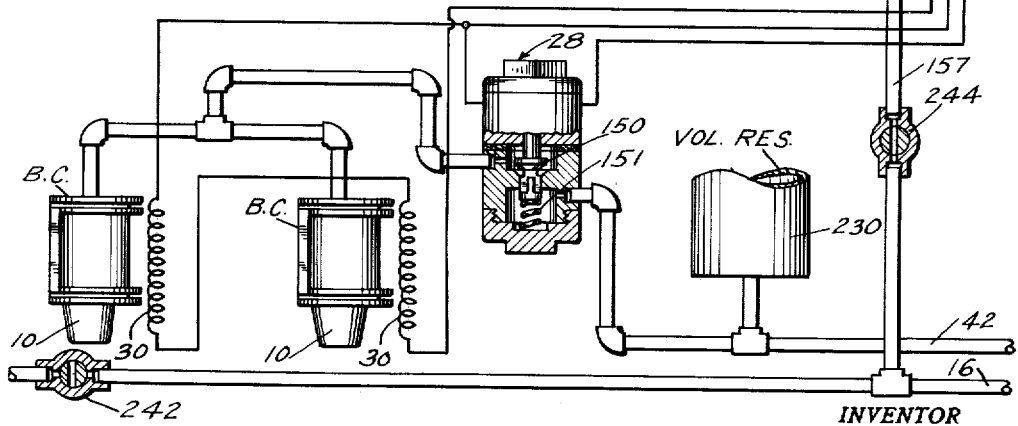
INVENTOR
JOHN W. LOGAN, JR.
BY
*Wm. W. Cady*
ATTORNEY

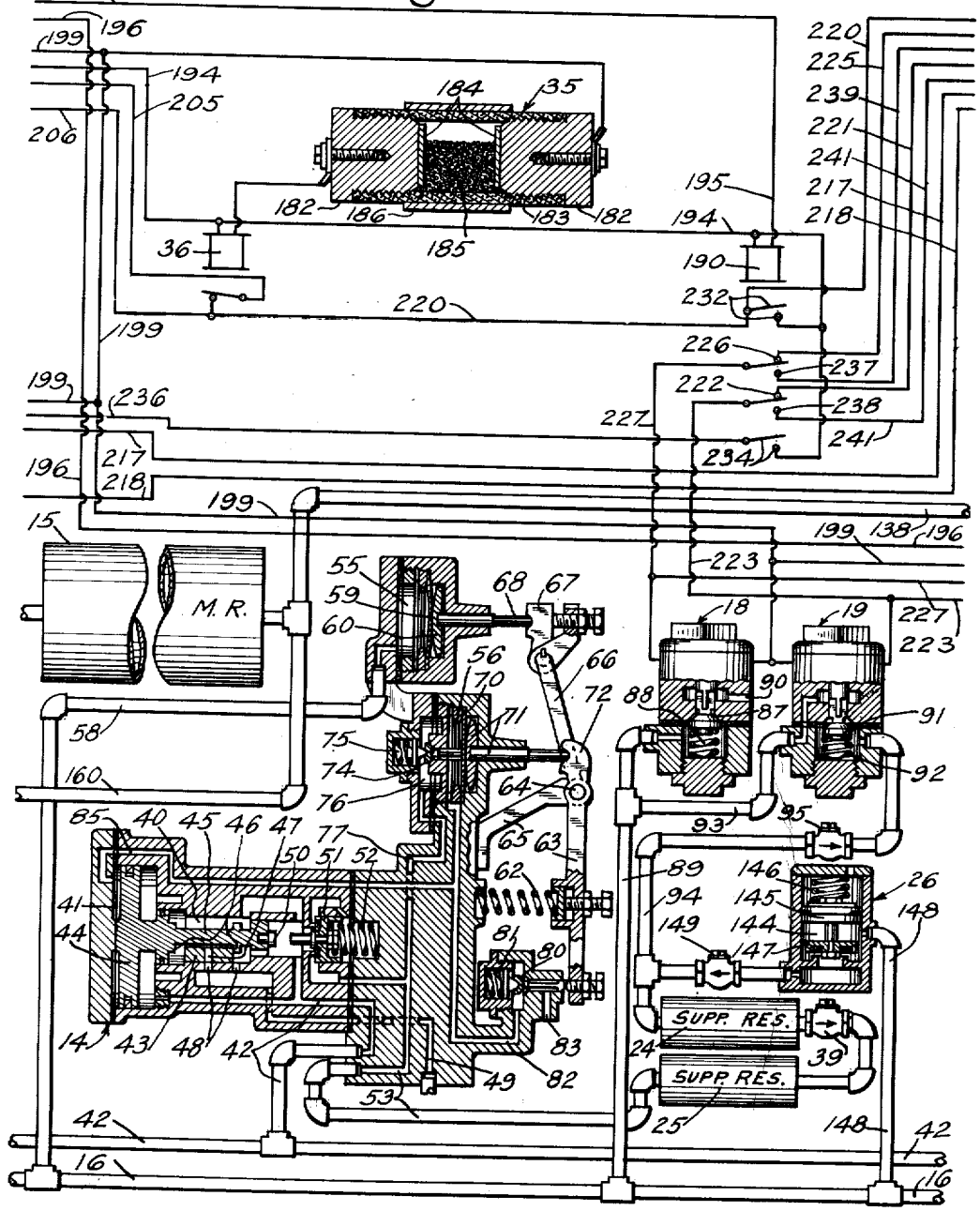

March 23, 1937.　　　J. W. LOGAN, JR　　　2,074,750
TRAIN BRAKE APPARATUS
Filed June 5, 1935　　　3 Sheets-Sheet 3
Fig. 1-B
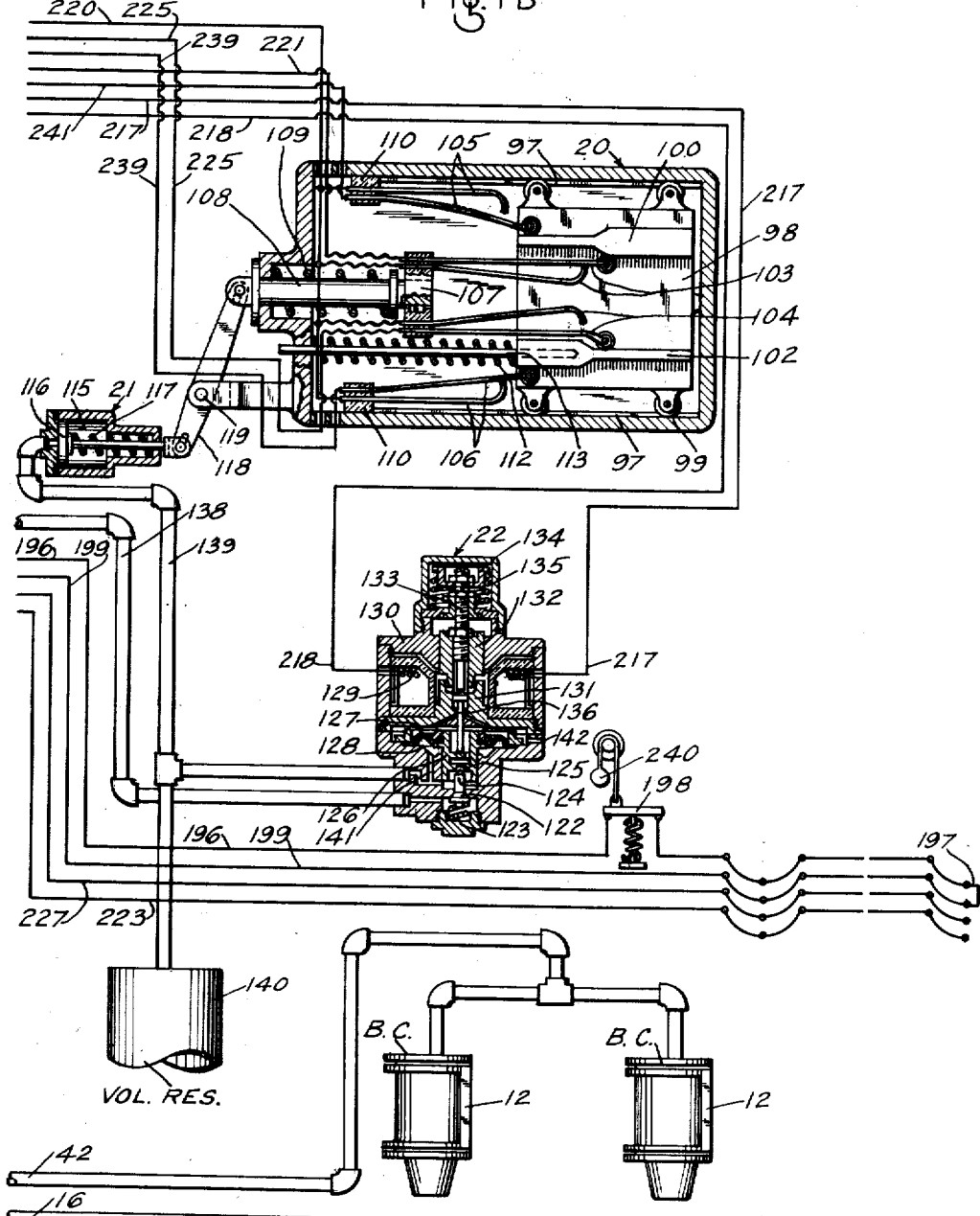
INVENTOR
JOHN W. LOGAN, JR.
BY
Wm. M. Bady
ATTORNEY Patented Mar. 23, 1937

2,074,750

UNITED STATES PATENT OFFICE 2,074,750

TRAIN BRAKE APPARATUS

John W. Logan, Jr., Forest Hills, Pa., assignor to The Westinghouse Air Brake Company, Wilmerding, Pa., a corporation of Pennsylvania Application June 5, 1935, Serial No. 24,995

28 Claims. (Cl. 303—3)

This invention relates to train brake apparatus, and more particularly to braking apparatus for high speed trains employing both fluid pressure brakes and electric brakes.

Modern, articulated type, high speed trains generally comprise a relatively heavy motor or power car coupled to a series of relatively light trailer cars. The increased weight of the motor car over a trailer car is essentially due to the power unit on this car. Because of the greater weight of the motor car considerably greater braking is required to stop this car than is required to stop any one of the trailer cars.

As is well known in the art, if friction type brakes solely are employed in high speed trains, extremely high braking forces must be applied at the high speeds to start rapid deceleration of the train, because friction brakes are less effective at the high speeds than at the low speeds, due to the coefficient of friction between the rubbing parts being lower at the high speeds than at the low speeds.

In order to produce high retarding forces at the high speeds by other means, it has been proposed to use a brake of the electrodynamic type, such for example as the eddy current brake. It is characteristic of an eddy current brake that the braking effect produced is substantially a function of the current supplied to the exciting windings of the brakes, as this type brake can be designed to produce a substantially constant braking effect for any degree of exciting current so long as the train speed is higher than some minimum value, as for example eight or ten miles per hour. Below this low speed, the braking effect begins to decrease, first slowly and then rapidly, until at zero speed the eddy current brake produces no braking effect at all.

Eddy current brakes are therefore most effective in the upper range of speeds, and for this reason it has been proposed that one of these brakes be associated with the shaft of each drive motor, to exert a braking effect on the car axles through the motor gearing. This can be done readily on the motor car but cannot be done as readily on the trailer trucks, or other trucks not having driving motors, without employing additional gearing and shafts. Such additional gearing and shafts will add to the weight of the non-driving trucks, and is therefore undesirable.

The present invention contemplates a brake apparatus in which eddy current brake devices are provided on the trucks of the motor car only which have driving motors associated therewith, in addition to the regular fluid pressure operated brakes on all the trucks throughout the train.

Because the operating characteristics of a fluid pressure brake and an eddy current brake are dissimilar, it is a principal object of the present invention to provide a brake apparatus comprising both of these types of brakes with control means for operating the two types of brakes in harmony with each other.

In high speed trains of the type referred to, the load on the driving or traction trucks of the motor car is practically constant regardless of the load on the trucks of the trailer cars. The load on the trailer trucks will vary over a wide range while the load on the traction or driving trucks will remain practically constant. Therefore, with eddy current brakes provided on the traction or driving trucks of the motor car, and the load on these trucks remaining practically constant, the rate of retardation of the motor car can be controlled by controlling the degree of energization of the eddy current brake windings, because the braking effect produced by the eddy current brakes will be substantially constant over the greater part of the speed range. The degree of the current supplied to the eddy current brake windings will therefore correspond very closely to the rate of retardation produced on the motor car by application of the eddy current brakes.

Now if when making normal stops, the eddy current brakes alone are applied on the motor car and the fluid pressure brakes are applied on the trailer cars, the degree of current supplied to the eddy current brake windings may be employed to control the degree of application of the fluid pressure brakes on the trailer cars, so that the rate of retardation of the trailer cars may correspond to the rate of retardation of the motor car. It is, therefore, a further object of this invention to provide means controlled by the current supplied to the eddy current brakes on the motor car for controlling the rate of retardation produced by application of the fluid pressure brakes on the trailer cars.

As the speed of the train diminishes below some low speed, as eight or ten miles per hour, the effectiveness of the eddy current brakes will diminish, so that it is desirable that the fluid pressure brakes provided on the motor car be applied at the end of the stop to insure that the train will be brought to a stop and held at rest. It is therefore a still further object of the invention to provide a brake apparatus of the character referred to in which the eddy current brakes only on the motor car are initially applied and maintained applied, but when the speed of the car drops below some predetermined value the fluid pressure brakes on the motor car are then applied to a degree sufficient to hold the car at rest.

A yet further object of the invention is to provide means for cutting the eddy current brakes on the motor car out of action when the fluid pressure brakes on that car are cut into action.

A yet further object of the invention is to provide a brake equipment of the character heretofore referred to, which incorporates a safety feature commonly referred to as "deadman control".

Further objects of the invention dealing with specific features of control and arrangement of apparatus involving novel construction will be more apparent from the description which follows, which description is taken in connection with the attached drawings, wherein, Figs. 1, 1A, and 1B, taken together, illustrate one embodiment of the invention in connection with the motor car of an articulated type train.

Fig. 2 is a plan view diagrammatically indicating operation of a cam and plunger in the brake valve device shown in the upper part of Fig. 1.

While the drawings show apparatus for one car only, it will be hereinafter pointed out how the embodiment may be adapted to a train comprising a plurality of cars.

Considering briefly at first the embodiment illustrated, the fluid pressure brake equipment comprises brake cylinders 10, which are associated with the driving or traction trucks, or driving axles, of the motor car, and brake cylinders 12 which are associated with non-driving trucks, or axles, of trailer cars, such as those of the articulation between the motor car and the first trailer car. A brake application valve device 14 is provided for controlling the supply of fluid under pressure to and its release from the brake cylinders 10 and 12. Operation of the brake application valve device 14 is controlled according to variations of pressure in a brake pipe 16.

For controlling variations in the pressure of fluid in the brake pipe 16, there are provided a brake pipe venting magnet valve device 18 and a cut-off magnet valve device 19.

For controlling the degree of application of the fluid pressure brakes according to a selected rate of retardation, there are provided a retardation controller device 20, a retardation controller operating cylinder 21, and a self-lapping magnet valve device 22.

For providing for a source of fluid under pressure from which fluid is supplied to the brake cylinders by the brake application valve device 14, there are provided supply reservoirs 24 and 25. These reservoirs are charged from the brake pipe 16, through a reservoir cut-off valve device 26.

For isolating the brake cylinders 10 while the eddy current brake devices are producing a braking effect on the trucks with which these brake cylinders are associated, there is provided a brake cylinder cut-off magnet valve device 28.

The eddy current brake devices associated with the driving or traction trucks are diagrammatically indicated by windings 30.

For effecting and controlling applications of both the fluid pressure brakes and eddy current brakes, there is provided a manually operated brake valve device 32.

For isolating the fluid pressure control portion of the brake valve device 32 when the speed of the train is above a predetermined value, there is provided a brake valve cut-off magnet valve device 34.

For cutting the eddy current brakes out of action at a low speed where they are relatively ineffective, and for effecting a supply of fluid under pressure to the brake cylinders 10 when the eddy current brake devices are thus cut out of action, there are provided a low speed circuit controller device 35 and an application relay 36, which controls energization of a line switch or circuit breaker 38 for the eddy current brakes and also energization of the aforementioned brake valve cut-off magnet valve device 34.

Considering now more in detail the devices above enumerated, the brake application valve device 14 is embodied in a casing provided with a slide valve chamber 40 and a piston chamber 41. The slide valve chamber 40 is in communication with the brake cylinders 10 and 12 by way of pipe and passage 42. Disposed in the chamber 40 is a slide valve 43, and disposed in the piston chamber 41 is a piston 44 for operating the slide valve 43. The piston 44 is provided with a stem 45 having shoulders 46 thereon adapted to engage the slide valve 43 after a lost motion movement of the piston.

When the piston 44 and slide valve 43 are in the position shown in the drawings, the slide valve chamber 40 is in communication with the atmosphere by way of port 47 in the slide valve and seat ports 48 and passage 49.

When the piston 44 is actuated to the right, slide valve 43 is, after a lost motion movement of the piston, shifted to a position where seat ports 48 are blanked and the piston stem end 50 engages the stem of a supply valve 51, to unseat it against opposition of a spring 52 to supply fluid under pressure from the supply reservoirs 24 and 25, through pipe and passage 53, past the unseated valve 51, to the chamber 40, and from thence to the brake cylinders. A check valve 39 permits flow from reservoir 24 to reservoir 25, but prevents flow in the opposite direction.

Piston 44 is actuated to the right by the supply of fluid under pressure to piston chamber 41. For controlling the supply of fluid under pressure to this chamber, there is provided a mechanism operating according to pressures in a brake pipe chamber 55 and a control chamber 56.

The brake pipe chamber 55 is connected to the brake pipe 16 by a pipe 58, and contains therein a flexible diaphragm 59 subject on one side to brake pipe pressure and on the other side to pressure exerted on a movable abutment 60. Pressure on the movable abutment 60 is exerted by a spring 62 acting upon a lever 63 secured to a shaft 64 carried by a bracket 65. Pressure exerted on the lever 63 by spring 62 is carried from the shaft 64 to the movable abutment 60 through a second lever 66, secured to the shaft 64, and an adjustable connector 67 having a stem 68 bearing against the abutment 60.

The control chamber 56 has disposed therein a second diaphragm 70 subject on one side to pressure of fluid in the chamber 56 and on the other side to pressure exerted on a stem and abutment 71. Pressure on the stem 71 is also exerted by the spring 62 through the lever 63 and an extension 72 of this lever.

Supply of fluid under pressure to the control chamber 56 is controlled by a valve 74, which is urged toward a seated position by spring 75, disposed in a supply chamber 76. The supply chamber 76 is in open communication with the supply reservoir 25, by way of passage 77 and pipe and passage 53.

The parts described are so adjusted that when the pressure in the brake pipe 16, and consequently that in brake pipe chamber 55, is normal, as for example above sixty pounds per square inch, diaphragm 59 is actuated its full distance to the right. Levers 66 and 63 are thus rotated to an extreme clockwise position against tension of spring 62. For this position of the levers no pressure is exerted on the diaphragm 70 and it permits spring 75 to seat valve 74, to close communication between the control chamber 56 and the supply chamber 76.

At the same time, the lower end of lever 63 engages a stem of a release valve 80 to unseat this valve against opposition of a spring 81, to open a communication between the control chamber 56 and the atmosphere, by way of passage 82 and exhaust port 83.

When the pressure of fluid in brake pipe chamber 55 is reduced below normal, i. e. below sixty pounds per square inch, spring 62 overbalances the pressure to the left of diaphragm 59, whereupon levers 63 and 66 are rotated in a counterclockwise direction until a balance point is reached. Initial movement of lever 63 permits release valve 80 to be seated by spring 81, and subsequent movement actuates diaphragm 70 to the left to effect unseating of the supply valve 74. Fluid under pressure then flows from the supply reservoirs 24 and 25 through pipe and passage 53, passage 77, past the supply valve 74, and through passages 82 and 85 to the piston chamber 41.

Piston 44 is thus actuated to the right to close off the exhaust communication to the atmosphere and to effect a supply of fluid under pressure to the brake cylinders. When the pressures on either side of the piston 44 are substantially equal, spring 52 actuates piston 44 to a lap position, where valve 51 is seated and seat ports 43 continue to be blanked by slide valve 43.

It will thus be seen that the degree of fluid under pressure supplied to brake cylinders depends upon the degree of production of pressure in the brake pipe chamber 55 below normal, and consequently upon the like degree of reduction of pressure in the brake pipe 16.

The brake pipe venting magnet valve device 18 is embodied in a casing provided with a valve 87 urged toward a seated position by a spring 88, and toward an unseated position by action of an electromagnet in the upper part of the casing, which when energized actuates the valve downwardly. When the valve 87 is unseated, the brake pipe 16 is vented to the atmosphere by way of pipe 89, past the unseated valve 87, and through exhaust port 90. When the valve 87 is seated, this communication is closed.

The cut-off magnet valve device 19 is embodied in a casing provided with a valve 91 urged toward a seated position by a spring 92, and toward an unseated position by action of an electromagnet in the upper part of the casing which when energized actuates the valve downwardly. When the valve 91 is unseated, a communication is established from the supply reservoir 24 to the brake pipe 16, by way of pipe 94, check valve device 95 (which permits flow of fluid only in the direction indicated by the arrow), past valve 91, and through pipes 93 and 89. When the valve 91 is seated, this communication is cut off.

The retardation controller device 20 is similar to that described in my Patent No. 2,052,202, and is embodied in a casing having a trackway 97 in which an inertia operated body 98 is adapted to move on wheels 99. The inertia operated body 98 has secured thereto an upper cam 100 and a lower cam 102 for operating service contacts 103 and 104, and emergency contacts 105 and 106.

The service contacts 103 and 104 are carried by and insulated from each other by an insulating member 107 secured to a slidable plunger 108. A spring 109 urges the plunger 108 to a biased position to the right. The emergency contacts 105 and 106 are secured to the casing of the retardation controller device and insulated therefrom by insulating members 110.

The inertia operated body 98 is urged to an extreme right hand position by a spring 112 concentrically disposed on a stem 113 having one end thereof secured to the inertia operated body and the other end thereof slidable in a bore in the retardation controller casing. The retardation controller device is positioned on the motor car in a manner such that when the vehicle is decelerating the inertia operated body 98 is urged to the left according to the rate of deceleration.

The operating cylinder 21 is embodied in a casing provided with a piston chamber 115 in which is disposed a piston 116 urged toward the left by a spring 117. When fluid under pressure is supplied to the piston chamber 115 to the left of piston 116, the piston actuates a lever 118 in a counterclockwise direction. The lever 118 is pivoted intermediate its ends at 119 and has one end secured to the plunger 108, so that when the lever 118 is rotated in a counterclockwise direction, the plunger 108, and consequently the service contacts 103 and 104, are positioned to the left according to the movement of piston 116.

The self-lapping magnet valve device 22 is embodied in a casing provided with a supply valve 122 urged toward a seated position by spring 123. The supply valve 122 has an upwardly extending stem terminating in a release valve 124 adapted to coact with a seat 125 formed in a slidable member 126. The slidable member 126 is secured to a flexible diaphragm 127 which is designed to hold the slidable member 126 in the position shown in the drawings when no external force or forces are acting upon either side of the diaphragm.

The diaphragm 127 is subject on its lower side to pressure from a chamber 128, and on its upper side to downward pressure exerted by an electromagnet having winding 129. The metallic casing 130 enclosing the self-lapping magnet valve device provides the magnetic circuit for the flux established upon energization of the winding 129 and is magnetically integral with a stationary core member 131. Disposed within and slidable vertically within the casing is a movable core member 132. This core member has a stem 133 secured thereto provided with a spring cup 134 against which reacts a spring 135.

When the winding 129 is deenergized, spring 135 positions the movable core 132 in an upper position. When the winding 129 is energized, the core 132 is attracted downwardly against opposition of spring 135 according to the degree of energization of the winding. Downward movement of core 132 causes stem 133 to engage a stem 136 to actuate the slidable member 126 downwardly, whereupon release valve 124 is first seated, and then supply valve 122 is unseated.

Unseating of supply valve 122 effects a supply of fluid under pressure from a main reservoir 15 to piston chamber 115 of the retardation controller operating cylinder 21, by way of pipe 138, past the unseated supply valve 122, and through pipe 139. Fluid also flows to a volume reservoir 140, which is provided to insure a more gradual operation of the piston 116, due to the increased volume added to the system.

Fluid flowing to pipe 139 also flows through passage 141 to chamber 128 below diaphragm 127, and when the pressure acting upwardly on this diaphragm overbalances the pressure acting downwardly due to energization of winding 129, the slidable member 126 moves upwardly to permit seating of supply valve 122. The supply to pipe 139 is then lapped. It will thus be obvious that the degree of fluid under pressure supplied to the pipe 139 depends upon the degree of energization of the winding 129.

If the pressure in chamber 128 should overbalance that acting downwardly upon diaphragm 127, then the diaphragm and slidable member 126 move upwardly, so that release valve 124 will unseat. Fluid under pressure will be then released from the pipe 139 to the atmosphere, through exhaust port 142.

The reservoir cut-off valve device 26 is embodied in a casing provided with a piston chamber 144 in which is disposed a piston 145 urged downwardly by a spring 146 to effect seating of a valve 147. Piston chamber 144 is connected to brake pipe 16 by way of pipe 148, and when the pressure of fluid in the brake pipe is sufficient to overcome the pressure exerted by the spring 146, piston 145 is actuated upwardly to unseat valve 147, and thus permit fluid to flow from the brake pipe past the unseated valve 147, through one way check valve 149, to the supply reservoirs 24 and 25.

The brake cylinder cut-off magnet valve device 28 and the brake valve cut-off magnet valve device 34 are essentially duplicate devices, with the exception that the latter is designed to be slow acting. Each is embodied in a casing provided with a valve 150 urged toward an unseated position by a spring 151, and toward a seated position by action of an electromagnet in the upper part of the valve casing which when energized actuates the valve downwardly. When valve 150 of the magnet valve device 28 is seated, the brake cylinders 10 are isolated from the fluid pressure brake system. When the valve 150 of the magnet valve device 34 is seated, the brake valve device 32 is isolated from the brake pipe 16.

The manually operated brake valve device 32 comprises two sections, an eddy current brake controller section 154 and a self-lapping valve section 155. The self-lapping valve section 155 comprises a casing defining a pressure chamber 156, which is in communication with the brake pipe 16 by way of pipe 157 and the aforementioned brake valve cut-off magnet valve device 34.

For controlling communication between the main reservoir 15 and the pressure chamber 156, there is provided a supply valve 158, which is urged toward a seated position by a spring 159. When the valve 158 is unseated, fluid under pressure flows from the main reservoir 15 through pipe 160, past the unseated valve 158, to the pressure chamber 156.

In an upper part of the valve device casing, there is provided a chamber 162 in which is disposed a movable abutment in the form of a piston 163. This movable abutment contains interiorly thereof a release valve 164 which is urged toward an unseated position by a spring 165, and when unseated establishes communication between the pressure chamber 156 and the atmosphere, by way of passages 166 and 167 and port 168.

The movable abutment 163 is subject on its right hand side to pressure of fluid in the pressure chamber 156, and on its left hand side to pressure of a regulating spring 169. Tension on the regulating spring 169 is governed by a regulating member 170, into which is screwed a stop 171 for engaging a plunger 172 associated with the movable abutment 163, to limit the movement thereof to the left.

For controlling operation of the release valve 164 and operation of the supply valve 158, there is provided a mechanism including a lever 174 pivotally carried at 175 intermediate its ends by a slidable pivot carrier 176. The upper end of the lever 174 is rounded and is adapted to engage the stem of the release valve 164, while the lower end of the lever is recessed to engage a stem 177 secured to the supply valve 158.

An operating shaft 178 having an operating handle 179 is provided with a cam 180 secured thereto for actuating the slidable pivot carrier 176. The handle 179 is adapted to be moved from a release position through an application zone and to an emergency position, as indicated in Fig. 2.

When the handle 179 is actuated from release position through the application zone, the cam 180 permits the pivot carrier 176 to be actuated to the right, as viewed in Fig. 1, by the supply valve spring 159. As soon as the supply valve 158 is seated, the lever 174 pivots about its lower ends to permit release valve 164 to be unseated by spring 165. Fluid under pressure is then vented from the pressure chamber 156 to the atmosphere past the unseated release valve and through passages 166 and 167 and port 168.

When the pressure in pressure chamber 156 diminishes, regulating spring 169 actuates the movable abutment 163 to the right until release valve 164 is again seated, whereupon the pressures on either side of the movable abutment balance. It will be obvious that the further the pivot carrier 176 is permitted to be actuated to the right, the lower the pressure will be in pressure chamber 156 before release valve 164 is seated. Therefore, the pressure in pressure chamber 156 depends upon the position of handle 179 in the application zone.

When the handle 179 is moved to the emergency position indicated in Fig. 2, the pivot carrier 176 is then permitted to be moved to an extreme position to the right, beyond which the regulating spring 169 is effective in causing seating of release valve 164. As a consequence, the pressure in pressure chamber 156 will be reduced to atmospheric pressure, to effect an emergency application of the brakes, as will hereinafter more fully appear.

The low speed circuit controller device 35 is preferably secured to some part of the vehicle or train which receives appreciable vibration during movement, as for example a truck frame. This device comprises two electrically conducting elements 182 secured in spaced relation through an insulating member 183 and having special conducting face plates 184 between which are disposed electrically conducting granules 185, as carbon or the like. A bracket 186 may be employed to secure the device to some part of the vehicle.

The characteristic of importance in connection with this device is that when the device is subjected to vibration the granules 185 separate so that the resistance of the conducting path between the face plates 184 is relatively high, and when the device is at rest the particles settle, so that the resistance of this path is relatively low. For example, it has been found that the resistance during vibration may rise to ten times the value of the resistance at rest.

Therefore, if the conducting elements 182 are connected in a circuit leading to the application relay 36, then when the device is being vibrated the resistance introduced into the circuit will be high enough to prevent appreciable flow of current, so that the relay will not open its contacts, and when the device is at rest or only slightly vibrated the value of the current will rise beyond a predetermined value, at which the relay will open its contacts.

The operation of this embodiment of my invention is as follows:

Running condition

When the vehicle is running the brake valve handle 179 is maintained in release position. In this position of the handle, the supply valve 158 is maintained unseated and the release valve 164 seated. The brake pipe 16 is thus charged from the main reservoir 15, by way of pipe 160, pressure chamber 156, pipe 157, and past the unseated valve 150 of the brake valve cut-off magnet valve device 34.

The supply reservoirs 24 and 25 are charged from the brake pipe 16 through the reservoir cut-off valve device 26 and are maintained charged to a pressure somewhat below that existing in the brake pipe. As an example, if the main reservoir and brake pipe pressure is maintained at approximately 80 pounds per square inch, then the reservoir cut-off valve device 26 is adjusted to charge the supply reservoirs 24 and 25 to some pressure so that when an application of the fluid pressure brakes is made the pressure in these reservoirs will not fall below 60 pounds per square inch.

So long as the train or vehicle is running above a low speed, as for example 5 miles per hour, the low speed circuit controller device 35 will be vibrated sufficiently to maintain the application relay 36 substantially deenergized, or energized to such a low value that it cannot open its contacts.

Also, at all times while the vehicle or train is running the operator maintains closed a deadman switch 188 by manually applying sufficient pressure to overcome a spring 189 tending to open the switch. Closing of this switch maintains energized an emergency relay 190, from a battery 191, through a circuit which includes, beginning at the battery, conductor 192, switch 193, conductor 194, relay 190, conductor 195, switch 188, conductor 196 (which will extend throughout the train where a number of cars are employed), conductor's switch 198, a jumper 197 at the end of the vehicle or train, conductor 199 (which will also extend throughout the train), and from thence through switch 193 to the other terminal of battery 191.

Relay 190 will then close its upper contacts and open its lower contacts, as shown in Fig. 1A. The purpose of this relay and its functioning will appear more fully in the description of a deadman application which follows hereinafter.

The other parts of the brake apparatus will be in the positions as shown in the drawings, so that both the fluid pressure brakes and the eddy current brakes will be released.

Service application

When it is desired to effect a service application of the brakes, the brake valve handle 179 is moved into the application zone to a degree according to the desired degree of braking. When the handle is thus moved, a drum contact 202, of the controller portion 154, first bridges and connects two stationary contact fingers 203, to energize the line breaker 38 and the brake valve cut-off magnet valve device 34, through a circuit, which beginning at the battery 191, includes, conductor 192, switch 193, conductor 204, contact fingers 203, conductor 205, contacts of relay 36, conductor 206, line breaker 38, conductor 207, magnet valve device 34, conductor 208, and switch 193 to the other terminal of the battery 191.

Energization of line switch 38 closes its contacts to supply current from a suitable source on the car to the windings of the eddy current brake devices 30, through a circuit including conductor 209, contacts of line switch 38, resistance 210, resistance device 211, conductor 212, eddy current brake windings 30, and conductor 213 back to the source of current supply. The eddy current brake devices will therefore be cut into action upon bridging of the two contact fingers 203, with all of the resistance 210 in the circuit.

Energization of the brake valve cut-off magnet valve device 34 causes it to seat its valve 150 to isolate the brake valve device 32 from the brake pipe 16. Therefore, if the brake valve handle 179 is moved to a position where the pressure is reduced in the pressure chamber 156, this will not also reduce the pressure in the brake pipe because seating of the valve 150 prevents this.

If the brake valve handle 179 has been moved far enough for the drum contact 202 to have engaged one or more of the stationary contact fingers 215, then one or more of the contactors 216 will be energized, as is obvious from the circuits shown, to cut out portions of the resistance 210. When the last of these contactors 216 has closed its contacts, all of the resistance 210 except a small portion will have been cut out of the circuit, while the resistance device 211 will remain connected in the circuit.

As soon as current flows through the resistance device 211, winding 129 of the self-lapping magnet valve device 22 will have current supplied thereto proportional to the voltage drop across the resistance device 211. The circuit for energizing winding 129 includes, beginning at the resistance device 211, conductor 217, winding 129, conductor 218, brake cylinder cut-off magnet valve device 28 (which now seats its valve 150), and from thence to the resistance device 211 by way of conductor 212.

Energization of winding 129 actuates the movable core 132 downwardly to first seat the release valve 124 and then unseat supply valve 122. Fluid under pressure then flows from the main reservoir 15 through pipe 138, past unseated valve 122, and through pipe 139 to piston chamber 115 of the operating cylinder 21, and also to volume reservoir 140. This supply of fluid is lapped when the degree of pressure corresponds to the degree of energization of winding 129, as before explained.

Fluid pressure in piston chamber 115 causes the plunger 108 of the retardation controller device 20 to be actuated to the left, to position service contacts 103 and 104 to an application position according to movement of the plunger. As these contacts are moved to the left, contacts 103 are opened due to the roller associated therewith rolling off the adjacent high part of cam 100, while shortly thereafter contacts 104 are closed due to the roller associated therewith rolling onto the adjacent high part of the cam 102.

Opening of contacts 103 deenergizes the cut-off magnet valve device 19 by opening a circuit from the battery 191, which beginning at the battery, includes, conductor 192, switch 193, conductor 204, contact fingers 203, conductor 205, contacts of application relay 36, conductor 220, contacts 103, conductor 221, contact 222 of emergency relay 190, conductor 223, magnet valve device 19, conductor 199, and switch 193 to the other terminal of the battery 191. Valve 91 is then seated by spring 92 to cut off communication between the brake pipe 16 and the supply reservoir 24.

Closing of contacts 104 effects energization of the brake pipe venting magnet valve device 18, and this valve device then unseats its valve 87 to vent fluid under pressure from the brake pipe to the atmosphere through port 90. The circuit for energizing this magnet valve device includes, beginning at the battery 191, the same conductors up to and including conductor 220 previously described, and from thence through contacts 104, conductor 225, contacts 226 of emergency relay 190, conductor 227, magnet valve device 18, conductor 199, and switch 193 to the other terminal of the battery 191.

As the pressure of fluid in the brake pipe 16 and chamber 55 diminishes below the normal value of 60 lb. per sq. in. due to venting to the atmosphere, levers 66 and 63 rotate in a counter-clockwise direction. As a consequence, release valve 80 is then seated by spring 81, and supply valve 74 unseated due to the pressure exerted on stem and abutment 71 by the extension 72 of lever 63. Upon unseating of valve 74, fluid under pressure flows from the supply reservoirs 24 and 25 through pipe and passage 53, passage 77, past unseated valve 74, chamber 56, and passages 82 and 85 to piston chamber 41. Piston 44 is thus actuated to the right to first lap seat ports 48 and to then unseat supply valve 51.

Upon unseating of supply valve 51, fluid under pressure flows from the supply reservoirs 24 and 25 through pipe and passage 53, past the unseated valve 51, chamber 40, and through pipe and passage 42 to the brake cylinders 12. Since valve 150 of the magnet valve device 28 will have previously been seated, fluid under pressure cannot flow to the brake cylinders 10, but may flow to a volume reservoir 230. This reservoir is provided to limit the pressure in brake cylinders 12 to that which would result for a given operation of the valve device 14 had brake cylinders 10 been likewise connected, and also to provide for a quicker and more uniform application of the brakes when brake cylinders 10 are subsequently connected to pipe 42, upon deenergization of the brake cylinder cut-off magnet valve device 28.

As the braking action of both the eddy current and fluid pressure brakes becomes effective, the vehicle will be retarded and the inertia effect on the inertia operated body 98 of the retardation controller device 20 will cause this body to move to the left. When the body has moved far enough for contacts 104 to be opened, the brake pipe venting magnet valve device 18 will be deenergized to cut off further venting of the brake pipe 16. The supply of fluid under pressure to the brake cylinders 12 will then be lapped by action of the brake application valve device 14, as previously described, according to the reduction in brake pipe pressure.

If the rate of retardation produced by the supply of fluid under pressure to the brake cylinders 12 and energization of the eddy current brake devices 30 is great enough to cause movement of the body 98 to a position where contacts 103 are again closed, the cut-off magnet valve device 19 will be energized to establish communication between the supply reservoir 24 and the brake pipe 16. Fluid under pressure will then flow from supply reservoir 24 through pipe 94, check valve device 95, past unseated valve 91, and through pipes 93 and 89 to the brake pipe, to build up brake pipe pressure. This increase in brake pipe pressure will cause the brake application valve device 14 to reduce the pressure of fluid supplied to the brake cylinders 12, so that the rate of retardation will likewise diminish.

Since winding 129 of the self-lapping magnet valve device 22 has been energized to a degree according to the degree of energization of the eddy current brake device windings 30, it will be obvious that positioning of service contacts 103 and 104 selects a rate of retardation according to the degree of application of the eddy current brakes. Therefore, the retardation controller device 20 will function to control the application of the fluid pressure brakes so that the braking effect produced on the trailer cars will produce a rate of retardation corresponding to the rate of retardation produced on the motor car by the eddy current brakes. Movement of the brake valve handle 179 to application position then selects a desired rate of retardation, which rate is maintained by joint action of the fluid pressure brakes and eddy current brakes.

As the speed of the vehicle diminishes, the effectiveness of the eddy current brakes on the motor car will begin to decrease at some low speed, as for example 8 or 10 miles per hour. As the eddy current braking on the motor car decreases, the retardation controller device 20 will function to increase the fluid pressure braking on the trailer cars. However, before there is any appreciable increase of fluid pressure braking, the train speed will have dropped to the point where the low speed circuit controller device 35 will effect sufficient energization of the application relay 36 to cause it to open its contacts. As soon as these contacts are open, the supply circuit to the retardation controller device 20, and the circuit to the line switch 38 and brake valve cut-off magnet valve device 34, will be interrupted.

Interruption of the supply circuit to the retardation controller device 20 renders this device ineffective to control the magnet valve devices 18 and 19, so that both of these devices will be deenergized. When these devices are deenergized, the fluid pressure brakes on the trailer cars will be lapped.

Line switch 38 is of the slow release type, while the brake valve cut-off magnet valve device 34 is of the slow acting type, so that a predetermined interval of time for each device elapses before it will have actuated. During the interval of time required for the line switch 38 to open its contacts, to thereby deenergize the eddy current brake windings 30, the vehicle or train will be decelerating to a stop due to braking on the trailer cars by the lapped fluid pressure brakes and due to braking on the motor car by the diminishing eddy current brakes.

By the time the vehicle or train comes to a stop, line switch 38 will have opened its contacts, and the flow of current through the resistance device 211 will cease. Winding 129 of the self-lapping magnet valve device 22 will then be deenergized, as will be the brake cylinder cut-off magnet valve device 28 also. Deenergization of winding 129 will cause service contacts 103 and 104 of the retardation controller device to be returned to their normal or release position.

Deenergization of the brake cylinder cut-off magnet valve device 28 will permit its valve 150 to be unseated by the spring 151, so that brake cylinders 10 on the motor car are connected to brake cylinder pipe 42. Fluid under pressure then flows to the brake cylinders 10 to apply the fluid pressure brakes on the motor car. Due to the pressure of fluid stored in the volume reservoir 230, fluid will be supplied to the brake cylinders 10 at a relatively rapid rate and without appreciably diminishing the pressure of fluid in the brake cylinders 12. In addition, by employing the volume reservoir 230, the brake application valve device 14 will function more gradually than if the volume reservoir were omitted. Therefore, change-over from eddy current braking to fluid pressure braking on the motor car will be accomplished smoothly and without unnecessary violent action of the brake application valve device.

By the time the brake cylinders 10 are cut into action, the brake valve cut-off magnet valve device 34 will have permitted its valve 150 to be unseated by its spring 151, so that control of brake pipe pressure is then transferred to the brake valve device 32. The pressure of fluid in the brake pipe will then adjust itself to correspond to the position of brake valve handle 179, and thereafter the operator may manipulate the handle 179 to vary brake pipe pressure as desired. Therefore, while the vehicle or train is at rest the operator has complete control over the application of the fluid pressure brakes.

To effect a release of the brakes, the brake valve handle 179 is turned to release position, as indicated in Fig. 2, whereupon release valve 164 is seated and supply valve 158 unseated to again charge the brake pipe 16 from the main reservoir 15. The brake application valve device 14 will then function to connect the brake cylinders 12 and 13 to the atmosphere, to release fluid under pressure therefrom. The other parts will assume the positions indicated in the drawings.

*Emergency applications*

When it is desired to effect an emergency application, this may be accomplished either by movement of the brake valve handle 179 to emergency position, as indicated in Fig. 2, by releasing the pressure on the deadman switch 188, or by opening conductor's switch 198.

If the brake valve handle 179 is turned to emergency position, the eddy current brakes 30 on the motor car will be energized to a maximum degree, as will be apparent from the operation heretofore described for a service application, while the retardation controller contacts 103 and 104 will as a result be actuated to their extreme left hand positions. Magnet valve device 18 will therefore be operated to vent fluid under pressure from the brake pipe to effect an emergency application of the fluid pressure brakes on the trailer cars. The functioning of the apparatus during this type of emergency application will be substantially like that described for a service application, the difference in operation being principally one of degree rather than in function.

If an emergency application is effected by release of pressure on deadman switch 188, either by accident or design, without movement of the brake valve handle 179 to emergency position, then the circuit to the emergency relay 190 will be interrupted and the contacts of this relay will drop to lower position.

Closing of the uppermost contact 232 of the emergency relay will immediately energize line switch 38 and brake valve cut-out magnet valve device 34, through a circuit which includes, beginning at battery 191, conductor 192, switch 193, conductor 194, contact 232, conductors 220 and 206, line switch 38, conductor 207, magnet valve device 34, conductor 208, and switch 193 to the other terminal of battery 191.

Closing of the lowermost contact 234 of the emergency relay will effect energization of the lowermost contactor 216, to cut out all of the variable portion of resistance 210. The circuit to this contactor includes the same circuit previously described from battery 191 up to and including conductor 194, from whence it includes contacts 234 of emergency relay 190, conductor 236, contactor 216, conductor 199, and switch 193 to the other terminal of battery 191. It will thus be seen that the eddy current brakes 30 will be applied to a maximum degree, while energization of the brake valve cut-off magnet valve device 34 will isolate the brake valve device 32 as described for previous applications.

Downward movement of the intermediate contacts of the emergency relay 190 will open contacts 226 and 222, and close contacts 237 and 238, to transfer control of the magnet valve devices 18 and 19 from the service contacts 103 and 104, in retardation controller device 20, to emergency contacts 105 and 106. Since the emergency contacts 105 are open, the cut-off magnet valve device 19 will be deenergized and its valve 91 will be seated by its spring 92. Since the emergency contacts 106 are closed, the brake pipe venting magnet valve device 18 will be energized and thus unseat valve 87 to vent the brake pipe 16 to the atmosphere. Energization of this latter magnet valve device is accomplished through a circuit which includes that previously described to the service contacts up to and including conductor 220, from whence it includes emergency contacts 106, conductor 239, contact 237 of emergency relay 190, conductor 227, magnet valve device 18, and from thence to the battery 191 by way of the circuit previously described.

The effect of transferring control of the magnet valve devices 18 and 19 from the service contacts 103 and 104 to the emergency contacts 105 and 106 is to limit the maximum permissible rate of retardation to the same value as when service contacts 103 and 104 are actuated to their extreme left hand position. The vehicle or train will thus be decelerated at the maximum permissible rate of retardation.

Of course, when the eddy current brakes are energized to a maximum degree, the self-lapping magnet valve device 22 will function to position the service contacts 103 and 104 to the extreme left hand position, but since emergency relay 190 has transferred control to the emergency contacts 105 and 106, this will have no functional significance unless for some reason opening of deadman switch 188 has failed to deenergize emergency relay 190.

With the retardation controller device 20 thus conditioned for the maximum permissible rate, the brake application valve device 14 will function to supply fluid under pressure to brake cylinders 12 to a maximum degree. And the control of brake cylinder pressure will be under the control of the retardation controller device 20 throughout the entire deceleration period, because although the low speed circuit controller device 35 will at the aforementioned low speed function to energize the application relay 36, this will have no effect upon energization of line switch 38 and magnet valve device 34, because energization of these devices is now maintained through contact 232 of the emergency relay 190. The vehicle or train will thus be braked with the eddy current brakes only on the control car or traction trucks applied and the fluid pressure brakes on the trailer trucks applied.

Now since both the fluid pressure and eddy current brakes are applied to a maximum degree, the vehicle or train will be decelerated rapidly. When the rate of retardation has reached the point where the inertia operated body 98 has moved far enough to the left for emergency contacts 106 to be opened, the venting magnet valve device 18 will be deenergized to cut off further venting of brake pipe 16. The fluid pressure brakes will then be lapped.

If the body 98 moves further to the left, emergency contacts 105 will then be closed, to energize the magnet valve device 19, to supply fluid under pressure from the supply reservoir 24 to the brake pipe 16, to effect a release of the fluid pressure brakes. It will thus be obvious that the body 98 will move back and forth to operate emergency contacts 105 and 106 to maintain the maximum permissible rate of retardation.

When the cut-off magnet valve device 19 is energized, the circuit established thereto includes that previously described up to and including conductor 228, from whence it includes contacts 105, conductor 241, contact 238, conductor 233, magnet valve device 19, from whence the return to the battery 181 is by way of the circuit previously described.

To release the brakes following this type of emergency application, pressure is again applied to the deadman switch 188. Emergency relay 190 will then be energized, line switch 38 and magnet valve device 34 will as a consequence be deenergized, and control of the brakes will be transferred to the brake valve device 32, which may then be manipulated to either hold the brakes applied or permitted to remain in release position.

An emergency application similar to that resulting from release of pressure on the deadman switch 198 may also be effected by opening conductor's switch 198. This is accomplished by pulling on the cord 240, and thus opening the same circuit opened when deadman switch 188 is opened. The functioning of the parts will then be the same as described for the preceding deadman emergency application.

While I have described my invention with particular reference to one vehicle, it should now be apparent that by duplication of such parts as the brake cylinders 12, brake application valve device 14, supply reservoirs 24 and 25, magnet valve devices 18 and 19, reservoir cut-off valve device 26, and conductor's switch 198, on every other trailer car, where an articulated type of train is employed, that the equipment shown is thus readily adaptable to a train comprising any number of trailer cars.

When it is desired to haul the train dead, as during switching operation or when the train is disabled, a towing vehicle may be coupled thereto and the brake pipe of the towing vehicle coupled to the left end of brake pipe 16, as viewed in Fig. 1. An angle cock 242 is then turned to connect the two brake pipes. At the same time, an angle cock 244 is turned to disconnect brake pipe 16 from pipe 157 leading to the brake valve device 32. As will then be apparent from the foregoing description of the other parts, the pressure in the brake pipe 16 will be under control of the operator on the towing vehicle, and the fluid pressure brakes on the articulated train may be applied by varying the pressure in the brake pipe 16 from the towing vehicle.

It should be further apparent that many modifications and changes in the specific arrangement illustrated may be made, and I do not therefore wish to be limited to the exact arrangement of parts illustrated, nor otherwise than by the spirit and scope of the appended claims.

Having now described my invention, what I claim as new and desire to secure by Letters Patent, is:

1. In a vehicle brake system, in combination, an electric brake means for producing a braking effect on the vehicle, a fluid pressure brake means for also producing a braking effect on the vehicle, means for effecting an application of the electric brake means to a chosen degree, means for simultaneously effecting an application of the fluid pressure brake means, means governed by the rate of retardation of the vehicle for limiting the degree of application of the fluid pressure brake means, and means for controlling said last means according to the degree of application of the electric brake means.

2. In a vehicle brake system, in combination, an electric brake means, a fluid pressure brake means, means for effecting an application of the electric brake means to a chosen degree, means for simultaneously effecting an application of the fluid pressure brake means, means operable at a chosen rate of retardation of the vehicle for limiting the degree of application of the fluid pressure brake means only, and means for establishing said chosen rate of retardation according to the degree of application of the electric brake means.

3. In a vehicle brake system, in combination, an electric brake means, a fluid pressure brake means, means for effecting an application of the electric brake means, a retardation controller device having a first means operable to effect an application of the fluid pressure brake means and a second means operable subsequently according to the rate of retardation of the vehicle for controlling the degree of application of the fluid pressure brake means, and means governed by the degree of application of the electric brake means for operating said first means.

4. In a vehicle brake system, in combination, an electric brake means, a fluid pressure brake means, means for effecting an application of the electric brake means according to a chosen degree, a control device having a first element operable to different positions and a second element operable according to the rate of retardation of the vehicle, means responsive to application of said electric brake means for positioning said first element according to the degree of application of said electric brake means, means responsive to the positioning of said first element for effecting an application of said fluid pressure brake means, and means responsive to operation of said second element for controlling the degree of application of said fluid pressure brake means.

5. In a vehicle brake system, in combination, an electric brake means, a fluid pressure brake means, means for supplying current to effect an application of said electric brake means, contacts positionable according to a desired rate of retardation, means for positioning said contacts according to the degree of current supplied to effect an application of said electric brake means, means responsive to positioning of said contacts for effecting an application of said fluid pressure brake means, and means operated according to the rate of retardation of the vehicle for subsequently operating said contacts to control the degree of application of said fluid pressure brake means.

6. In a vehicle brake system, in combination, an electric brake means, a fluid pressure brake means, means for supplying current to effect an application of said electric brake means, a retardation controller device having contacts movable to different positions and an inertia operated device for subsequently operating said contacts, means for positioning said contacts according to the degree of current supplied to effect an application of said electric brake means, and means responsive to positioning of said contacts for effecting an application of said fluid pressure brake means and subsequently responsive to operation of said contacts by said inertia operated device for effecting a release of said fluid pressure braking means.

7. In a vehicle brake system, in combination, a brake cylinder, a brake pipe, means operated upon a reduction in brake pipe pressure for supplying fluid under pressure to said brake cylinder, contacts adapted to be actuated to different positions according to a desired rate of retardation, means responsive to movement of said contacts to any one position for effecting a reduction in brake pipe pressure, and means responsive to the rate of retardation of the vehicle due to braking for subsequently operating said contacts to terminate the reduction in brake pipe pressure.

8. In a vehicle brake system, in combination, a brake cylinder, a brake pipe, means operated upon a reduction in brake pipe pressure for effecting a supply of fluid under pressure to said brake cylinder, a retardation controller device having contacts movable to different positions according to a desired rate of retardation and having a body responsive to the rate of retardation of the vehicle for subsequently actuating said contacts, and means responsive to movement of said contacts to a chosen position in selecting a rate of retardation for effecting a reduction in brake pipe pressure and responsive to operation of said contacts by said body for terminating the reduction in brake pipe pressure.

9. In a vehicle brake system, in combination, a brake cylinder, a brake pipe, means operated upon a reduction in brake pipe pressure for effecting a supply of fluid under pressure to said brake cylinder, a retardation controller device having contacts adapted to be operated at will and a body adapted to operate said contacts according to the rate of retardation of the vehicle, means responsive to operation of said contacts at will for effecting venting of the brake pipe, and means responsive to operation of said contacts by said body for terminating said venting.

10. In a vehicle brake system, in combination, a brake cylinder, a brake pipe, means operated upon a reduction in brake pipe pressure for effecting a supply of fluid under pressure to the brake cylinder, electroresponsive means for effecting a reduction in brake pipe pressure, contacts for controlling said electroresponsive means, an electric brake device, means for supplying current to operate said electric brake device, means responsive to said current for operating said contacts to cause said electroresponsive means to effect a reduction in brake pipe pressure, and means operated according to the rate of retardation of the vehicle for subsequently operating said contacts to effect a supply of fluid under pressure to said brake pipe.

11. In a vehicle brake system, in combination, an electric brake means, a fluid pressure brake means, a brake pipe, means operated upon a reduction in brake pipe pressure for effecting an application of said fluid pressure brake means, a retardation controller device operated according to the rate of retardation of the vehicle, means governed by operation of said retardation controller device for controlling the pressure of fluid in said brake pipe, and means governed by application of said electric brake means for controlling operation of said retardation control device.

12. In a vehicle brake system, in combination, an electric brake means, a fluid pressure brake means, manually operated control means for controlling application of both said electric brake means and fluid pressure brake means, means responsive to operation of said manually operated control means for effecting an application of both of said brake means, retardation control means governed by the rate of retardation of the vehicle, and means for automatically transferring control of said fluid pressure brake means from said manually operated means to said retardation control means.

13. In a vehicle brake system, in combination, an electric brake device, a brake cylinder, a brake pipe, means operated upon a reduction in brake pipe pressure for supplying fluid under pressure to said brake cylinder, manually operated control means for controlling the supply of current to said electric brake device and for effecting a reduction in brake pipe pressure, a retardation controller device operated according to the rate of retardation of the vehicle, and means controlled by said retardation controller device for controlling brake pipe pressure to vary the degree of fluid supplied to said brake cylinder.

14. In a vehicle brake system, in combination, an electric brake device, a brake cylinder, means for supplying current to operate said electric brake device, means operable to effect a supply of fluid under pressure to said brake cylinder according to the supply of current to said electric brake device, and means governed by the speed of the vehicle and being unaffected by the degree of effectiveness of the electric brake device for preventing supply of fluid under pressure to said brake cylinder until the speed of the vehicle has diminished to a predetermined value.

15. In a vehicle brake system, in combination, a brake cylinder, an electric brake device, means for supplying current to operate said electric brake device, means for effecting a supply of fluid under pressure through a communication leading to said brake cylinder, electroresponsive valve means responsive to current supplied to operate said electric brake device for closing said communication, and means operable at a low chosen speed of the vehicle for causing said electroresponsive valve means to open said communication.

16. In a vehicle brake system, in combination, an electric brake means adapted to be associated with the driving axles of a vehicle, a first fluid pressure brake means adapted to be also associated with said driving axles, a second fluid pressure brake means adapted to be associated with non-driving axles, means for effecting an application of said electric brake means, means for effecting an application of said second fluid pressure brake means, means for controlling the degree of application of said second fluid pressure brake means according to the degree of application of said electric brake means, and means governed by the speed of the vehicle and operable at a chosen speed to cut said electric brake means out of action and to effect an application of said first fluid pressure brake means.

17. In a vehicle brake system, in combination, electric brake means for producing a braking effect on the driving axles of the vehicle, a first fluid pressure brake means for also producing a braking effect on the driving axles, a second fluid pressure brake means for producing a braking effect on non-driving axles, means for effecting an application of the electric brake means, means for effecting an application of said second fluid pressure brake means, means for preventing an application of said first fluid pressure brake means while said electric brake means is effective and for effecting an application of said first fluid pressure brake means when said electric brake means decreases in effectiveness, and means governed by the rate of retardation of the vehicle and operative while the electric brake means is effective for limiting the degree of application of said second fluid pressure brake means.

18. In a vehicle brake system, in combination, an electric brake means, a fluid pressure brake means, a relay having an energized and a deenergized position, means operative when said relay is in its energized position for manually effecting application of both of said brake means, means operative when said relay is in its deenergized position for automatically effecting application of both of said brake means, and safety control means for controlling energization and deenergization of said relay.

19. In a vehicle brake system, in combination, an electric brake means, a fluid pressure brake means, means for effecting an application of both of said brake means, means for subsequently cutting said electric brake means out of action, a normally closed circuit, and means operable upon opening of said circuit for preventing cutting out of said electric brake means.

20. In a vehicle brake system, in combination, brake means, a retardation controller device having contacts movable to different positions according to a desired rate of retardation and a body operated according to the rate of retardation of the vehicle for operating said contacts, means responsive to positioning of said contacts for effecting an application of said brake means and responsive subsequently to operation of said contacts by said body for varying the degree of application of said brake means, and electroresponsive means for controlling the positioning of said contacts according to the degree of energization thereof.

21. In a vehicle brake system, in combination, electric brake means, fluid pressure brake means, means for supplying current to effect an application of said electric brake means, a retardation controller device having contacts movable from a biased position to various operating positions and having an inertia operated body for subsequently operating said contacts, means responsive to movement of said contacts to any operating position for effecting an application of said fluid pressure brake means and responsive to operation of said contacts by said body for varying the degree of application of said fluid pressure brake means, and electroresponsive means operable to effect movement of said contacts to an application position according to the degree of current supplied to effect an application of said electric brake means.

22. In a train brake system, in combination, electric brake means for producing a braking effect on a power car in the train, fluid pressure braking means for producing a braking effect on the other cars in the train, means for effecting an application of the electric brake means to a chosen degree, means for effecting an application of the fluid pressure brake means, means governed by the rate of retardation of the vehicle for controlling the degree of application of the fluid pressure brake means, and means for controlling said last means according to the degree of application of the electric brake means.

23. In a train brake system, in combination, electric brake means for the power unit of the train, fluid pressure brake means for the other units of the train, means for effecting an application of the electric brake means to a chosen degree, means for effecting an application of the fluid pressure brake means, means operable at a chosen rate of retardation of the train for controlling application of the fluid pressure brake means only, and means for establishing said chosen rate of retardation according to the degree of application of the electric brake means.

24. In a vehicle brake system, in combination, brake means, a retardation controller device having an element movable to different positions according to a desired rate of retardation and another element movable according to the rate of retardation of the vehicle, means responsive to movement of said first element for effecting an application of said brake means and responsive subsequently to movement of said second element for controlling the degree of application of said brake means, and electrically controlled means for controlling movement of said first element of said retardation controller device.

25. In a vehicle brake system, in combination, electric brake means, fluid pressure brake means, means for controlling application of both of said brake means, a retardation controller device having a set of service contacts and a set of emergency contacts for controlling the application of said fluid pressure brake means, means for rendering said service set of contacts effective according to the degree of application of said electric brake means to permit various service rates of retardation, and means for rendering said emergency set of contacts effective at desired times to permit an emergency rate of retardation.

26. In a vehicle brake system, in combination, electric brake means for producing a braking effect on certain axles of the vehicle, a brake cylinder for operating a friction brake on different axles of the vehicle, means for effecting the operation of said electric brake means to produce a braking effect, means for effecting a supply of fluid under pressure to said brake cylinder to produce a friction braking effect, the braking effect produced thereby increasing as the speed of the vehicle diminishes, and means for causing the retarding effect produced on the said different axles by supply of fluid under pressure to said brake cylinder to correspond throughout the entire decreasing speed range of the vehicle substantially to the degree to which the electric brake means was initially applied.

27. In a vehicle brake system, in combination, an electric brake means for producing a braking effect on the vehicle, a brake cylinder for operating a friction brake for also producing a braking effect on the vehicle, means for effecting the operation of said electric brake means to produce a braking effect to a chosen degree, means for effecting a supply of fluid under pressure to said brake cylinder to produce a friction braking effect, and means operated in response to and following the operation of said electric brake means for causing the retarding effect produced on the vehicle by supply of fluid under pressure to said brake cylinder to correspond throughout the decreasing speed range of the vehicle substantially to the chosen degree of application of the electric brake means.

28. In a vehicle brake system, in combination, an electric brake means, a fluid pressure brake means, a brake pipe, means for effecting an application of said fluid pressure brake means in response to a reduction in brake pipe pressure, means for supplying current to effect an application of said electric brake means, electrical means including contacts for controlling reductions in brake pipe pressure, and means operated responsive to and according to the degree of current supplied to effect an application of said electric brake means for controlling the operation of said contacts.

JOHN W. LOGAN, Jr.